March 21, 1967  C. R. OLNHAUSEN  3,310,140
COMBINATION CLUTCH AND TRANSMISSION SHIFT
ASSEMBLY BELLCRANK ARRANGEMENT
Filed May 21, 1965
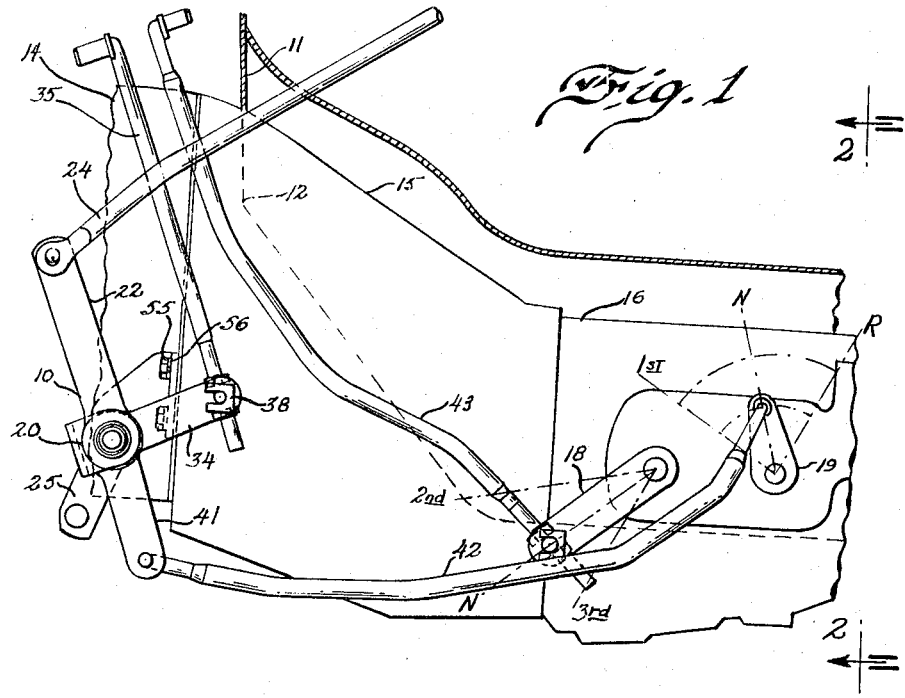
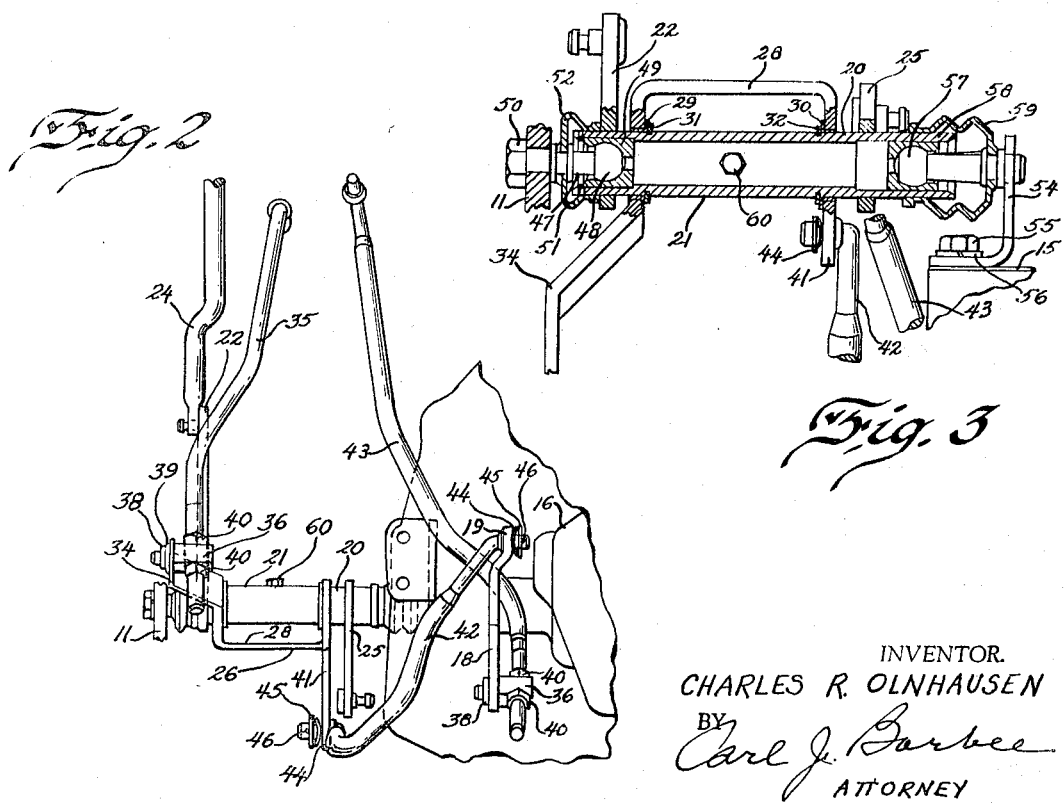
INVENTOR.
CHARLES R. OLNHAUSEN
BY
Carl J. Barbee
ATTORNEY United States Patent Office 3,310,140
Patented Mar. 21, 1967

3,310,140
COMBINATION CLUTCH AND TRANSMISSION SHIFT ASSEMBLY BELLCRANK ARRANGEMENT
Charles R. Olnhausen, Kenosha, Wis., assignor to American Motors Corporation, Kenosha, Wis., a corporation of Maryland
Filed May 21, 1965, Ser. No. 457,730
6 Claims. (Cl. 192—3.5)

This invention relates generally to clutch and transmission shift assemblies for vehicles and more particularly to a combination clutch and transmission shift assembly bellcrank arrangement.

The engine and transmission of a conventional vehicle are usually supported on rubber mountings to impede the transfer of vibrations to the vehicle body. Particularly in the type of vehicle having coil springs and a torque tube connecting the rear axle and the transmission to transfer acceleration and deceleration forces to the body, difficulties have developed due to the relative movement permitted by the mountings between the engine and transmission unit and the body. When it is recalled that the clutch pedal linkage is mounted on the body as is the shift assembly, it is clearly apparent that provisions must be made to compensate for this relative movement. Failure to do so causes clutch engagement difficulties and in the case of the shift assembly, movement of the transmission causes the shift assembly to move a control lever on the transmission and partially disengage the gears. Excessive gear damage results when severe loads are applied to improperly engaged gears.

Applicant has eliminated the above-noted clutch and transmission difficulties in an economical manner by providing a bellcrank arrangement that includes a rotatable shaft that is also pivotally mounted on the body and the clutch assembly of the engine by ball and socket joints located at each end of the shaft. The clutch bellcrank is completed by welding a pair of legs to the shaft between the shaft ends for rotation therewith. One leg of the clutch bellcrank is adapted to be connected by linkage to the clutch pedal and the other leg to the clutch throwout lever rod. Also mounted on the shaft but for rotation thereabout, is the bellcrank for the shift assembly. The shift assembly bellcrank has one leg, or what may be denominated an arm, connected to a rod which in turn is adapted to be connected to the first and reverse shift lever which may be located on the steering column and the other arm of the pair to a rod that is also connected to the related control lever on the transmission.

Inasmuch as the leg of the clutch bellcrank that is connected to the throw-out lever rod and the arm of the shift assembly bellcrank that is connected to the rod extending to the transmission are both adjacent the shaft end that pivotally mounts on the clutch assembly of the engine, relative movement of the engine and transmission does not cause the other leg and arm of the two bellcranks located near the vehicle body to affect clutch or transmission operation. The shaft, due to its ball and socket joints, pivots thereabouts and substantially absorbs the aforementioned relative movement thereby eliminating both clutch and transmission difficulties.

Although applicant has provided solely for the first and reverse shift lever in the bellcrank arrangement, it is readily apparent that a similar construction could be utilized for the second and third shift lever. Breakage of the second and third gears has not been a problem because of the greater length of the second and third control lever on the housing which produces less angular travel than the first and reverse control lever for the same relative movement of the transmission. In addition, the second and third gears of a conventional transmission are synchronized while the first and reverse gears are not.

It is, therefore, a primary object of this invention to provide a new and improved combination clutch and transmission shift assembly bellcrank arrangement for a vehicle.

Another object of this invention is to provide an economical combination clutch and transmission shift assembly bellcrank arrangement for a vehicle that substantially absorbs relative movement between the engine and transmission and the vehicle body.

Another object of this invention is to provide a combination clutch and transmission shift assembly bellcrank arrangement for a vehicle that includes a bellcrank shaft rotatably and pivotally mounted on the engine and the body to absorb relative motion therebetween.

Other objects will become apparent from the following description in conjunction with the attached drawing in which:

FIGURE 1 is a side view of the combination clutch and transmission shift assembly bellcrank arrangement of this invention mounted in position on a portion of a vehicle structure.

FIGURE 2 is a view of the bellcrank arrangement taken along line 2—2 of FIGURE 1.

FIGURE 3 is an enlarged plan view, partly in section, showing the pivotal mounting details of the bellcrank arrangement.

Referring to FIGURES 1 and 2, 10 indicates generally a vehicle combination clutch and transmission shift assembly bellcrank arrangement installed on a vehicle 11. Vehicle 11 has a toeboard and floor panel 12 and an engine 14 with a clutch assembly 15 attached thereto. Rearward of the clutch assembly is a conventional 3 speed manual transmission 16. Transmission 16 has a second and third gear control lever 18 and a first and reverse control lever 19 rotatably mounted thereon. The engine 14, clutch assembly 15 and transmission 16 are attached to the vehicle 11 by conventional rubber mountings (not shown) which substantially impede the transfer of vibrations therebetween.

Combination clutch and transmission shift assembly bellcrank arrangement 10 includes clutch bellcrank 20. Bellcrank 20 has a tubular shaft portion 21 and a pair of legs integral therewith and extending therefrom. One leg 22 of the pair is connected to the clutch pedal (not shown) by bellcrank rod 24 which extends into the vehicle passenger compartment through toeboard 12. The other leg 25 of bellcrank 20 is adapted for connection to the clutch throw-out rod (not shown).

As best shown in FIGURES 2 and 3, shift assembly bellcrank 26 has a mounting portion 28 which is rotatably supported on shaft portion 21 of clutch bellcrank 20 between legs 22 and 25 by bushings 29 and 30. Restraining axial movement of shift assembly bellcrank 26 on clutch bellcrank 20 are retainers 31 and 32. Shift assembly bellcrank 26 has a pair of arms integral therewith and extending therefrom. One arm 34 of the pair is located adjacent leg 22 of clutch bellcrank 20. Arm 34 is pivotally connected to shift lever rod 35 by trunion 36. Trunion 36 is connected to arm 34 by spring clip 38 and plate washer 39 and to threaded rod 35 by nuts 40. Rod 35 is also adapted to be connected at its other end to the first and reverse shift lever (not shown) which may be mounted on the vehicle steering column. The second arm 41 of the shift assembly bellcrank is located adjacent leg 25 of clutch bellcrank 20. Arm 41 is pivotally connected to control lever rod 42 by a spring washer 44, plate washer 45 and cotter pin 46. Rod 42 is similarly connected to the first and reverse control lever 19 on transmission 16. Second and third control lever 18 is connected to shift lever rod 43 through trunion 36 and its fastening members. Rod 43 is also adapted for connection to the second and third shift lever (not shown) which may be mounted on the vehicle steering column.

The tubular shaft portion 21 of clutch bellcrank 20, as best shown in FIGURE 3, is supported at one end which is adjacent leg 22 and arm 34 on the vehicle 11. This support includes a ball stud 47. The ball end 48 of stud 47 is compressively secured in the socket of slotted nylon bushing 49 located in tubular shaft portion 21. The threaded end of stud 47 is engaged by a nut 50 which tightly holds the stud shoulder to the vehicle 11. Axially securing stud 47 and bushing 49 in shaft portion 21 is string retainer 51 which extends through a slot in shaft 21 into the interior thereof to contact bushing 49. A rubber boot 52 extends between the shaft portion 21 and the stud 47 where same projects from the shaft portion 21 primarily to prevent entry of foreign material.

Tubular shaft portion 21 is similarly supported at its other end on the clutch assembly 15 of the engine. The clutch assembly support includes a bracket 54 secured to studs by nuts 55 and lockwashers 56. The bracket has a shaft with a ball end 57 welded thereto. The ball end 57 is compressively secured in the socket of slotted nylon bushing 58 located in the other end of shaft portion 21. Bushing 58 is axially slidable in shaft portion 21 to compensate for dimensional variances at assembly. Boot 59 prevents the entry of foreign material into bushing 58. Lubrication for the ball and socket connections is accomplished by use of filler plug 60 which extends into the interior of tubular shaft portion 21. Bushings 49 and 58 have openings for entry of lubricant to the ball ends 48 and 57 respectively located therein.

In operation, depressing the vehicle clutch pedal (not shown) caused rod 24 to move leg 22 of the clutch bellbrank 20 thereby rotating the shaft portion 21 thereof about the ball ends 48 and 57, preferably, of stud 47 and bracket 54. Rotation of the bellcrank causes leg 25 to move the clutch throw-out rod (not shown) to disengage the clutch. Similarly, movement of the first and reverse shift lever (not shown) causes the pivotally connected shift lever rod 35 through trunion 36 to move arm 34 of shift assembly bellcrank 26. Bellcrank 26 is thereby caused to rotate on bushings 29 and 30 about and independent of any rotation of the shaft portion 21 of clutch bellcrank 20. Arm 41 in turn moves control lever rod 42 which causes the first and reverse control lever 19 to assume the desired position to select either the first or reverse gear in the transmission 16. Selection of either the second or third gear is achieved by movement of the second and third shift lever (not shown) which actuates rod 43 and the corresponding control lever 18 on the transmission 16.

As best shown in FIGURES 1 and 3, should the engine and transmission move forward or rearward relative to the vehicle body on the aforementioned rubber mountings, the shaft portion 21 of clutch bellcrank 20 and bellcrank 26 located thereon pivots about ball ends 48 and 57. Arm 41 and leg 25 assume proportional positions thereby substantially absorbing the relative movement without affecting arm 34 or leg 22 adjacent the vehicle body. Without the pivoting action of shaft portion 21, and with the first and reverse shift lever in the reverse position, rearward movement of the transmission would tend to rotate arm 41 counterclockwise. Since the shift lever has a stop in the reverse position, arm 41 cannot move and via rod 42 pulls control lever 19 from the reverse position toward the neutral thereby partially disengaging the gears. Forward relative movement of the transmission 16 would tend to keep control lever 19 in reverse but causes the shift lever to move toward a neutral position.

In similar fashion, without the pivoting action of shaft portion 21 and if the shift lever was in first gear, forward motion of the transmission 16 would tend to cause arm 41 to move clockwise but since the shift lever has a stop thereon, the control lever 19 would be pushed by arm 41 toward neutral and partially disengage the first or low gear. Rearward movement of transmission 16 would tend to keep control lever 19 in first gear but move the associated shift lever toward neutral. Applicant's combination clutch to shift assembly bellcrank arrangement because of the pivoting action of shaft portion 21 on the ball ends 48 and 57 substantially absorbs the relative movement of the first and reverse control lever 19 on transmission 16. Further, the clutch engagement difficulties arising from the relative movement between clutch and vehicle are also eliminated.

Having thus described the invention, it will be apparent to those skilled in the art that various modifications and changes can be made therein without departing from the spirit of the invention or the scope of the appended claims.

I claim:

1. A combination clutch and transmission shift assembly bellcrank arrangement for a vehicle comprising:
   (a) a clutch bellcrank having a shaft portion and a pair of spaced legs, the first leg of said pair being adapted to be pivotally connected by suitable linkage to the clutch pedal and the second leg being adapted to be pivotally connected by suitable linkage to the clutch;
   (b) first support means for pivotally and rotatably mounting one end of said shaft portion on the body of the vehicle, said first means being located adjacent said first leg;
   (c) second support means for pivotally and rotatably mounting the other end of said shaft portion on the engine generally near the engine clutch, said second means being located adjacent said second leg;
   (d) a shift assembly bellcrank having a mounting portion and a pair of spaced arms with the mounting portion being rotatably mounted on said clutch bellcrank, said first arm of said pair being located adjacent said first leg and said second arm being located adjacent said second leg;
   (e) a shift lever rod pivotally connected to said first arm and being adapted to be pivotally connected to a transmission shift lever;
   (f) a control lever rod pivotally connected to said second arm and being adapted to be pivotally connected to a control lever on the transmisison, whereby upon movement of the transmission and engine relative to the vehicle body, said clutch bellcrank shaft portion being adapted to pivot about said first and second support means causing proportional movement of said second leg and said second arm without said first leg and said first arm effecting motion of the clutch or the control lever on the transmission to disengage gears.

2. A combination clutch and transmission shift assembly bellcrank arrangement for a vehicle comprising:
   (a) a clutch bellcrank having a shaft portion and a pair of spaced legs, the first leg of said pair being adapted to be pivotally connected by suitable linkage to the clutch pedal and the second leg being adapted to be pivotally connected by suitable linkage to the clutch;
   (b) first support means for pivotally and rotatably mounting one end of said shaft portion on the body of the vehicle, said first means being located adjacent said first leg;
   (c) second support means for pivotally and rotatably mounting the other end of said shaft portion on the engine generally near the engine clutch, said second means being located adjacent said second leg;
   (d) a shift assembly bellcrank having a mounting portion and a pair of spaced arms with the mounting portion being rotatably mounted on said clutch bellcrank shaft portion between said legs, said first arm of said pair being located adjacent said first leg, said second arm being located adjacent said second leg;
(e) a shift lever rod pivotally connected to said first arm and being adapted to be pivotally connected to a transmission shift lever on the steering column;
(f) a control lever rod pivotally connected to said second arm and being adapted to be pivotally connected to a control lever on the transmission, whereby upon movement of the transmission and engine relative to the vehicle body, said clutch bellcrank shaft portion being adapted to pivot about said first and second support means causing proportional movement of said second leg and said second second arm without said first leg and said first arm effecting motion of the clutch or the control lever on the transmission to disengage gears.

3. A combination clutch and transmission shift assembly bellcrank arrangement for a vehicle comprising:
(a) a clutch bellcrank having a tubular shaft portion and a pair of spaced legs, the first leg of said pair being adapted to be pivotally connected by suitable linkage to the clutch pedal and the second leg being adapted to be pivotally connected by suitable linkage to the clutch;
(b) first support means for pivotally and rotatably mounting one end of said shaft portion on the body of the vehicle, said first means being located adjacent said first leg;
(c) second support means for pivotally and rotatably mounting the other end of said shaft portion on the engine generally near the engine clutch, said second means being located adjacent said second leg;
(d) a shift assembly bellcrank having a mounting portion and a pair of spaced arms with the mounting portion being rotatably mounted on said clutch bellcrank shaft portion between the legs, said first arm of said pair being located adjacent said first leg, said second arm being located adjacent said second leg;
(e) a shift lever rod pivotally connected to said first arm and being adapted to be pivotally connected to the transmission first and reverse shift lever;
(f) a control lever rod pivotally connected to said second arm and being adapted to be pivotally connected to a first and reverse control lever on the transmission, whereby upon movement of the transmission and engine relative to the vehicle body, said clutch bellcrank shaft portion being adapted to pivot about said first and second support means causing proportional movement of said second leg and said second arm without said first leg and said first arm effecting motion of the clutch or the first and reverse control lever on the transmission to disengage the gears.

4. The combination clutch and transmission shift assembly bellcrank arrangement of claim 3 in which said first support means comprises: a slotted bushing mounted in said one end of said shaft, said bushing having a generally hemispherical internal surface, a stud having a threaded end adapted for securing same to the body and a ball end compressively secured in said bushing and retaining means for securing said bushing and said ball end of said stud in said shaft.

5. The combination clutch and transmission shift assembly bellcrank arrangement of claim 4 in which said second support means comprises: a slotted bushing mounted in said other end of said shaft, said bushing being axially slidable in said shaft, said bushing having a generally hemispherical internal surface, a ball shaft having a ball end compressively secured in said bushing, said ball shaft also being adapted for connection to a bracket to be affixed to the engine.

6. The combination clutch and transmission shift assembly bellcrank arrangement of claim 5 further comprising: lubrication means in said shaft portion for lubricating the ball pivots in the first and second support means and seal means for each ball pivot to prevent entry of foreign material.

References Cited by the Examiner
UNITED STATES PATENTS

| | | | |
|---|---|---|---|
| 1,999,262 | 4/1935 | Tenney | 192—99 |
| 2,252,871 | 8/1941 | Sohl. | |
| 2,578,158 | 12/1951 | Toot | 192—3.5 X |
| 3,049,023 | 8/1962 | McCordic | 74—473 X |

DAVID J. WILLIAMOWSKY, *Primary Examiner.*

A. T. McKEON, *Assistant Examiner.*